United States Patent
Callahan et al.

(10) Patent No.: US 8,408,574 B2
(45) Date of Patent: Apr. 2, 2013

(54) MODULAR TRAILING EDGE FOR BICYCLE STEM

(75) Inventors: Jean-Luc Callahan, San Jose, CA (US); Christopher P. D'Aluisio, Corralitos, CA (US); Mark Cote, Aptos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 67 days.

(21) Appl. No.: 13/087,058

(22) Filed: Apr. 14, 2011

(65) Prior Publication Data

US 2012/0261896 A1    Oct. 18, 2012

(51) Int. Cl.
*B62K 3/02*    (2006.01)

(52) U.S. Cl. .............. 280/281.1; 280/274; 280/288.4

(58) Field of Classification Search ............ 280/281.1, 280/274, 288.4
See application file for complete search history.

(56) References Cited

U.S. PATENT DOCUMENTS

| | | | |
|---|---|---|---|
| 5,222,752 A * | 6/1993 | Hewitt | 280/288.4 |
| 5,314,207 A * | 5/1994 | Camfield et al. | 280/828 |
| 5,782,139 A | 7/1998 | Fraiman | |
| 5,862,965 A | 1/1999 | Nakahara | |
| 7,393,125 B1 * | 7/2008 | Lai | 362/473 |
| 7,571,920 B2 | 8/2009 | Lane | |
| 7,819,413 B2 | 10/2010 | White | |
| 7,988,175 B2 * | 8/2011 | White | 280/281.1 |
| 2010/0090439 A1 * | 4/2010 | White | 280/281.1 |

* cited by examiner

*Primary Examiner* — Tashiana Adams
*Assistant Examiner* — Marlon Arce
(74) *Attorney, Agent, or Firm* — Michael Best & Friedrich LLP

(57) ABSTRACT

A bicycle including a front wheel, a rear wheel, and a frame supported on the front and rear wheels, the frame having a frame member. The bicycle further includes a first fairing member protruding outward from the frame member and having a side surface defining an aerodynamic trailing edge and a second fairing member detachably mounted on the first fairing member such that the side surface is exposed.

16 Claims, 6 Drawing Sheets

MODULAR TRAILING EDGE FOR BICYCLE STEM

BACKGROUND

The present invention relates generally to bicycles, and more specifically to aerodynamic trailing edges for bicycles.

In order to reduce wind resistance and thereby reduce the effort to propel a bicycle forward, bicycles commonly include tubes and components having aerodynamic shapes. Such aerodynamic shapes commonly include rounded leading edges and gradually-tapering trailing edges that will slice through the wind with reduced drag.

SUMMARY OF THE INVENTION

The present invention provides a bicycle including a front wheel, a rear wheel, and a frame supported on the front and rear wheels, the frame having a frame member. The bicycle further includes a first fairing member protruding outward from the frame member and having a side surface defining an aerodynamic trailing edge and a second fairing member detachably mounted on the first fairing member such that the side surface is exposed.

In one embodiment, the bicycle includes a front wheel, a rear wheel, and a frame supported on the front and rear wheels, the frame having a frame member. The bicycle further includes a front fork supported by the front wheel and rotationally coupled to the frame, a handlebar, a stem for coupling the handlebar to the front fork, the stem protruding upward above a portion of the frame member, and a fairing member detachably coupled to the frame member and positioned immediately behind the stem.

In another embodiment, the present invention provides a bicycle frame including a frame member, a first fairing member protruding outward from the frame member and having a side surface defining an aerodynamic trailing edge, and a second fairing member detachably mounted on the first fairing member such that the side surface is exposed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
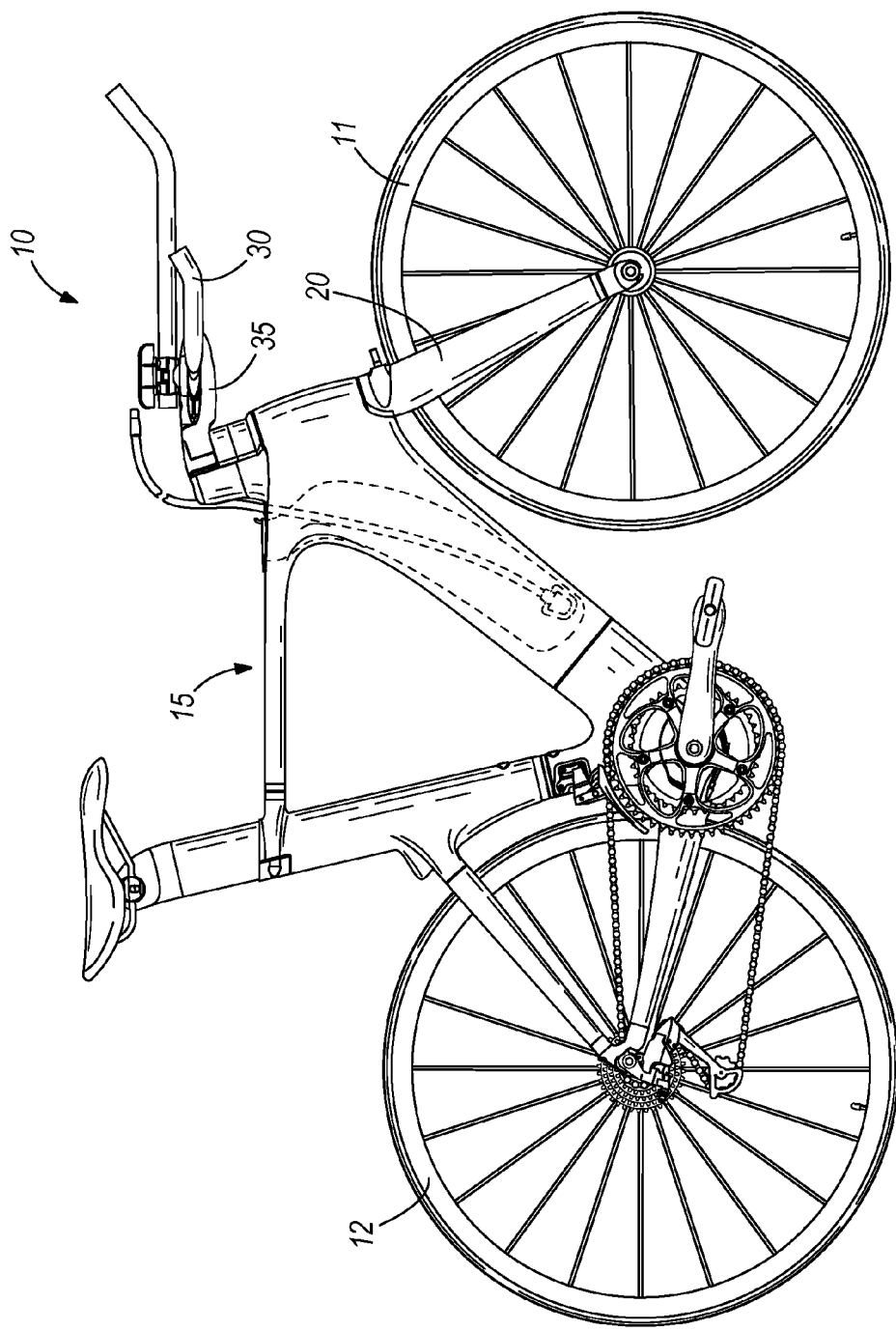
FIG. 1 is an assembled side view of a bicycle embodying the present invention.

FIG. 1 illustrates a bicycle 10 including a front wheel 11, a rear wheel 12, and a frame 15 supported on the front and rear wheels 11, 12. The bicycle 10 further includes a front fork 20 supported by the front wheel 11 and having a steerer tube 25 (FIG. 2) rotationally coupled to the frame 15. The bicycle 10 also includes a handlebar 30 that is coupled to the front fork 20 by a stem 35.

Figure 2:
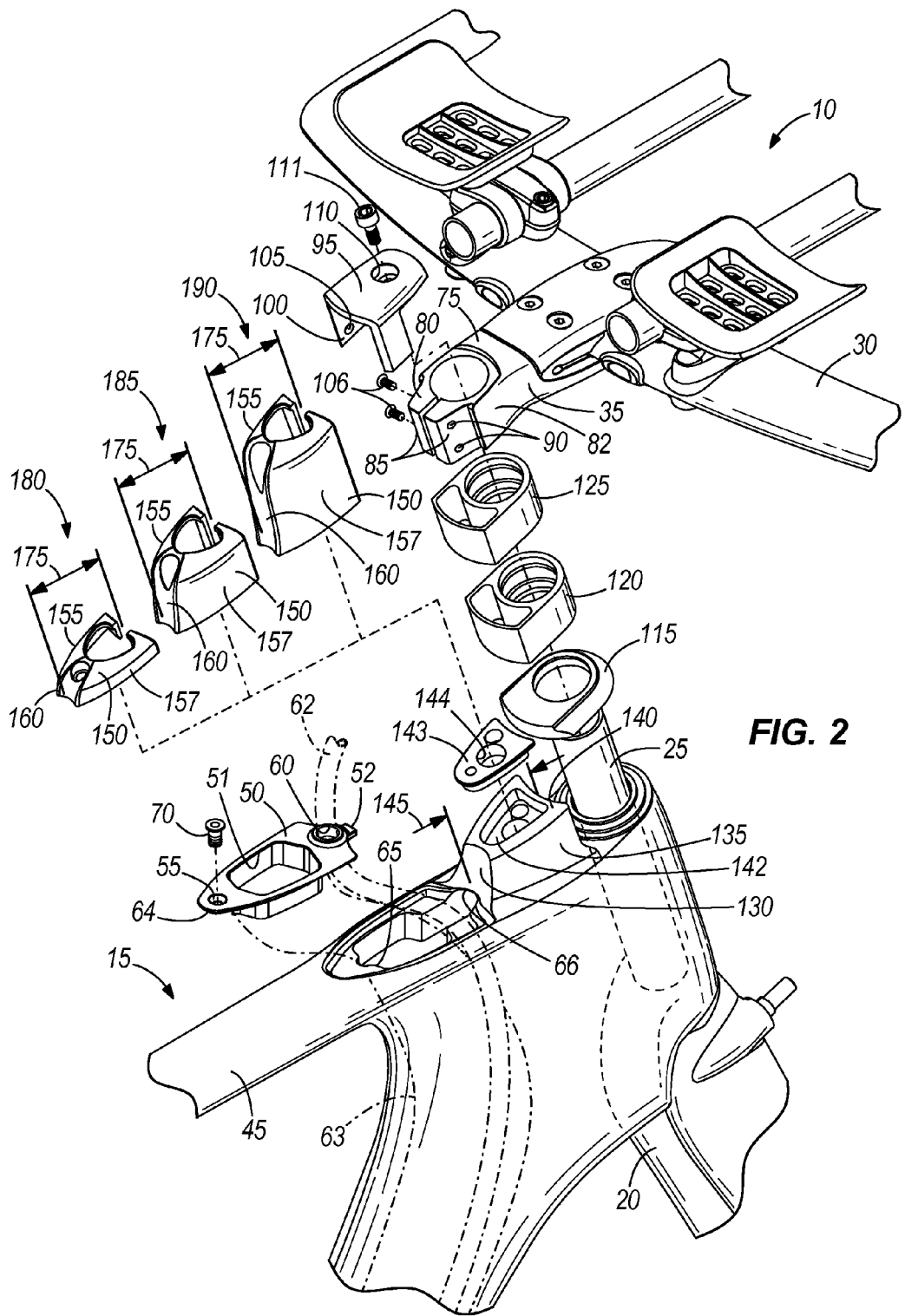
FIG. 2 is an exploded perspective view of a front portion of the bicycle in FIG. 1, illustrating three constructions of a fairing member.
Figure 3:
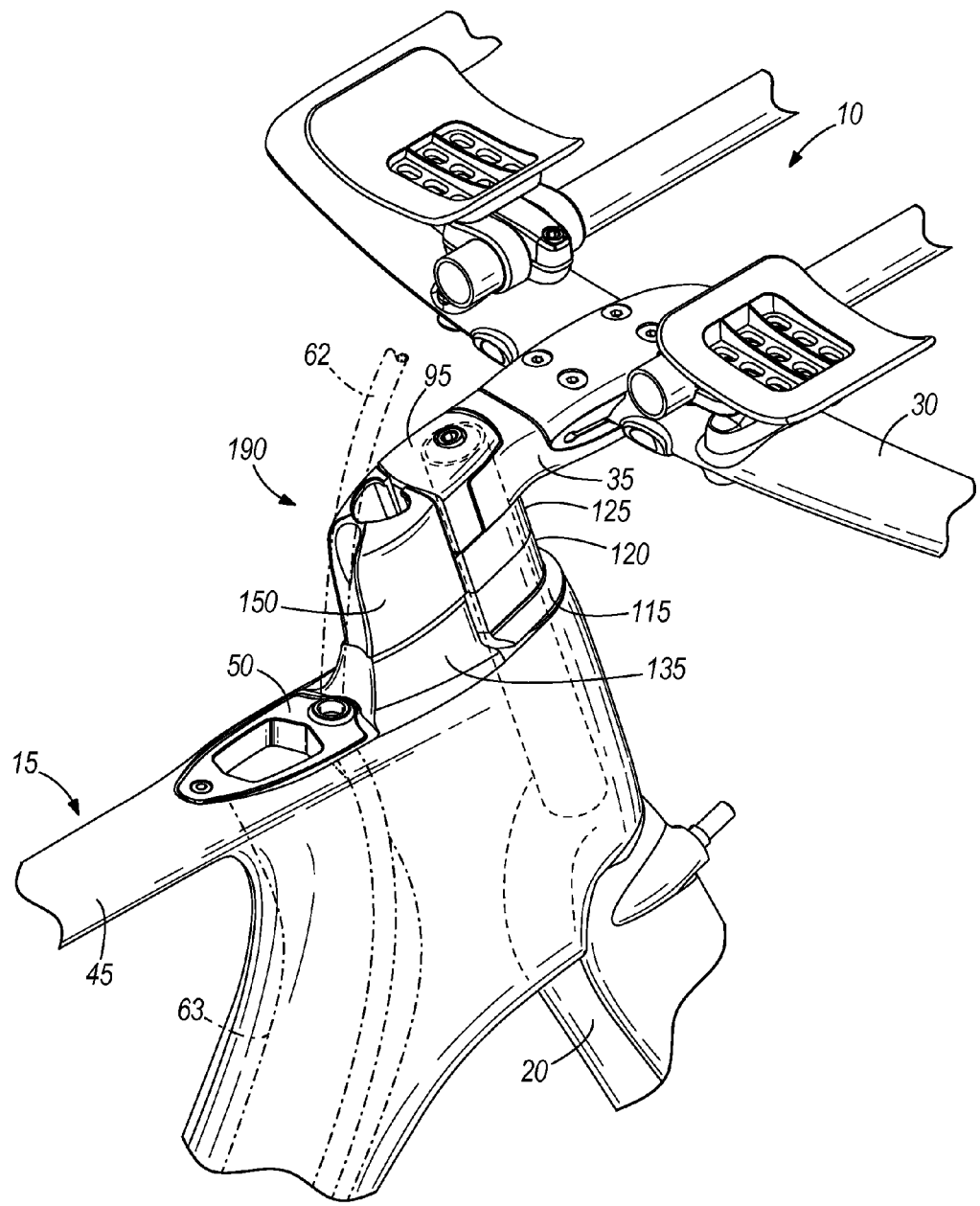
FIG. 3 is an assembled perspective view of the front portion of the bicycle in FIG. 2.

Referring to FIGS. 2 and 3, the illustrated frame 15 includes a frame member in the form of a top tube 45 of the frame 15. A collar 50 having a filling port 51, a protrusion 52, a first aperture 55, a second aperture 60, and a seal 64 is received in a recess 65 in the top tube 45 such that the protrusion 52 is received by a groove 66 in the recess 65. The seal 64 forms a sealing engagement with the top tube 45. The collar 50 is held in position relative to the top tube 45 by a fastener 70 positioned through the first aperture 55 and into the frame 15. Alternatively, the aperture 55 and the fastener 70 can be omitted and a first magnetic fastener (not shown) can be connected to the collar 50 and a second magnetic fastener (not shown) can be connected to the top tube 45 for magnetic engagement with the first magnetic fastener. The second aperture 60 is dimensioned to receive a hollow tube 62 of a hydration system.

The hollow tube 62 is coupled to a flexible bladder 63 that is removably positioned within the recess 65 of the top tube 45 of the frame 15. The flexible bladder 63 is in fluid communication with the filling port 51 of the collar 50.

Referring to FIG. 2, the stem 35 includes a top surface 75 having a recessed portion 80 and a pair of side surfaces 82 having a pair of opposing grooves 85, each with a pair of threaded holes 90. A cover 95 having a corresponding pair of opposing inner surfaces 100 with holes 105 and an aperture 110 is dimensioned to be received in the recessed portion 80 such that the holes 105 are aligned with the holes 90 of the stem 35. Two fasteners 106 are received by the holes 90 to clamp the stem 35 to the steerer tube 25. Note that a tool (e.g., an allen wrench—not shown) can access the fasteners 106 through the holes 105 in the cover 95. The aperture 110 is dimensioned to receive a top bolt 111 for axially tightening the stem 35 to the steerer tube 25. The stem 35 is supported by a base 115 dimensioned to be substantially flush with the sides 82 of the stem 35. The base 115 mounts to the frame 15. A first stem spacer 120 and second stem spacer 125, also dimensioned to be substantially flush with the sides 82 of the stem 35, can be mounted on the base 115 for adjusting the height of the top surface 75 of the stem 35. For a low stem 35 height, both the first and second stem spacers 120, 125 are omitted (see FIG. 4). For a mid stem 35 height, the second stem spacer 125 is omitted (see FIG. 5). For a high stem 35 height, both the first and second stem spacers 120, 125 are included (see FIG. 6).

A first fairing member 130 includes a side surface 135 that defines an aerodynamic trailing edge. The first fairing member 130 further includes a first outer surface 140 having a recess 142 that receives a cover 143 having an aperture 144. The aperture 144 is dimensioned to receive a cable (not shown), such as a brake cable positioned in a brake cable housing. The first outer surface 140 faces away from the top tube 45. The first fairing member 130 includes a first front-to-back dimension 145. The first fairing member 130 is coupled to the top tube 45 such that the first fairing member 130 protrudes outward from the top tube 45. The first fairing member 130 is positioned immediately behind the stem 35 and entirely rearward of the steerer tube 25. The illustrated first fairing member 130 is integrally formed with the top tube 45.

A second fairing member 150 includes an upper surface 155 that is substantially flush with the top surface 75 of the stem 35 and a side surface 157 that is substantially flush with the side surface 82 of the stem 35. The second fairing member 150 further includes a concave tail edge 160 that is dimensioned to receive the hollow tube 62 of the hydration system, thereby improving the aerodynamics of the tube 62 and second fairing member 150. The second fairing member 150 includes a second front-to-back dimension 175, where the first front-to-back dimension 145 is greater than the second front-to-back dimension 175. The second fairing member 150 is detachably mounted on the first outer surface 140 of the first fairing member 130 such that the side surface 135 of the first fairing member 130 is exposed. The second fairing member 150 is positioned immediately behind the stem 35 and entirely rearward of the steerer tube 25. Second fairing member 150 constructions of varying height are shown including a low second fairing member 180 for use with the low stem height configuration, a mid second fairing member 185 for use with the mid stem 35 height configuration, and a high second fairing member 190 for use with the high stem 35 height configuration. In the illustrated design, only one of the low, mid, and high second fairing members 180, 185, 190 can be used at a time.

Figure 4:
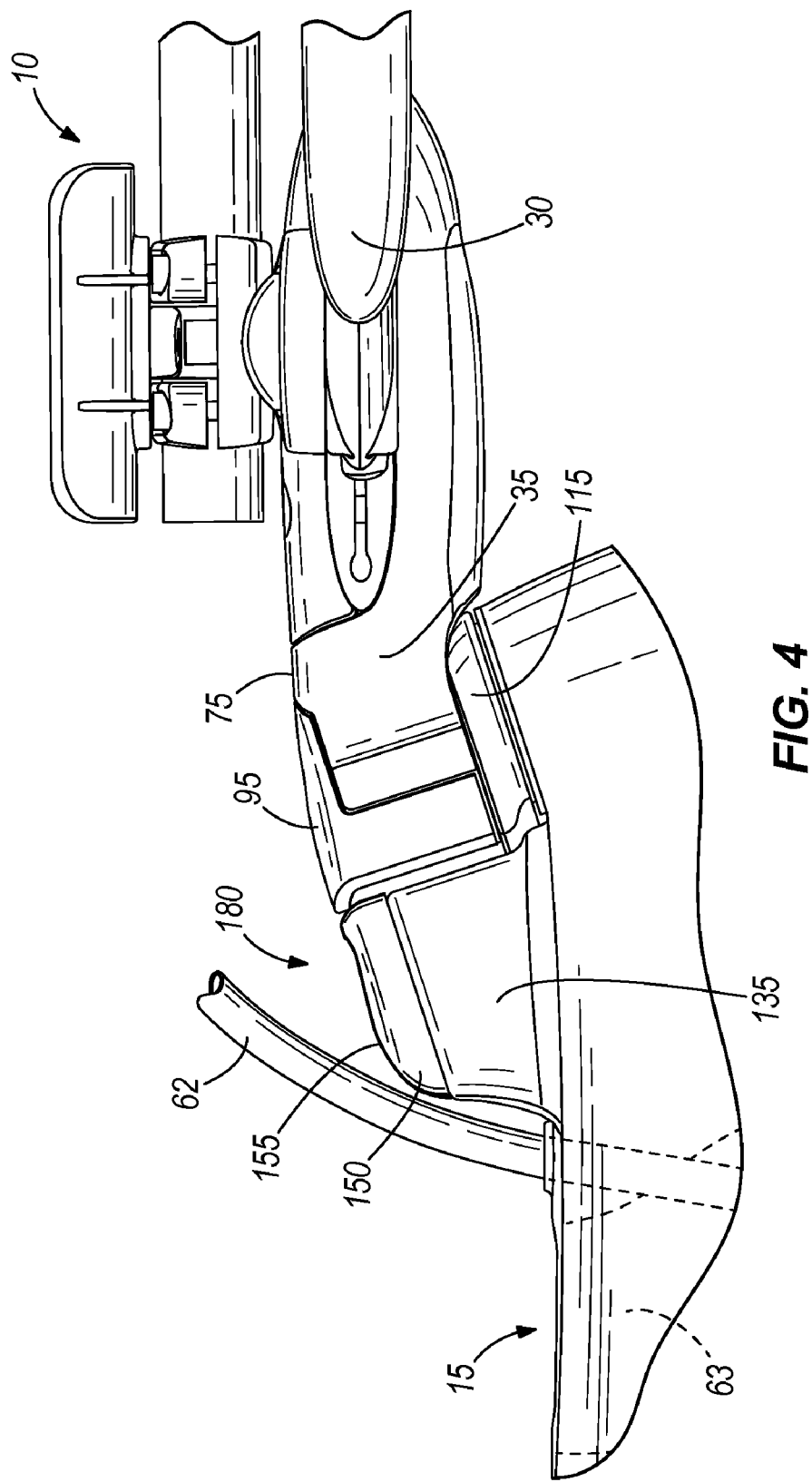
FIG. 4 is an assembled side view of the front portion of the bicycle in FIG. 2, incorporating a first construction of the fairing member.

FIG. 4 illustrates use of the low second fairing member 180 when the stem 35 is in the low stem height configuration. In this arrangement, the first and second stem spacers 120, 125 (FIG. 2) are omitted and the stem 35 mounts directly on the base 115. Note that the upper surface 155 of the low second fairing member 180 is substantially flush with the top surface 75 of the stem 35.

Figure 5:
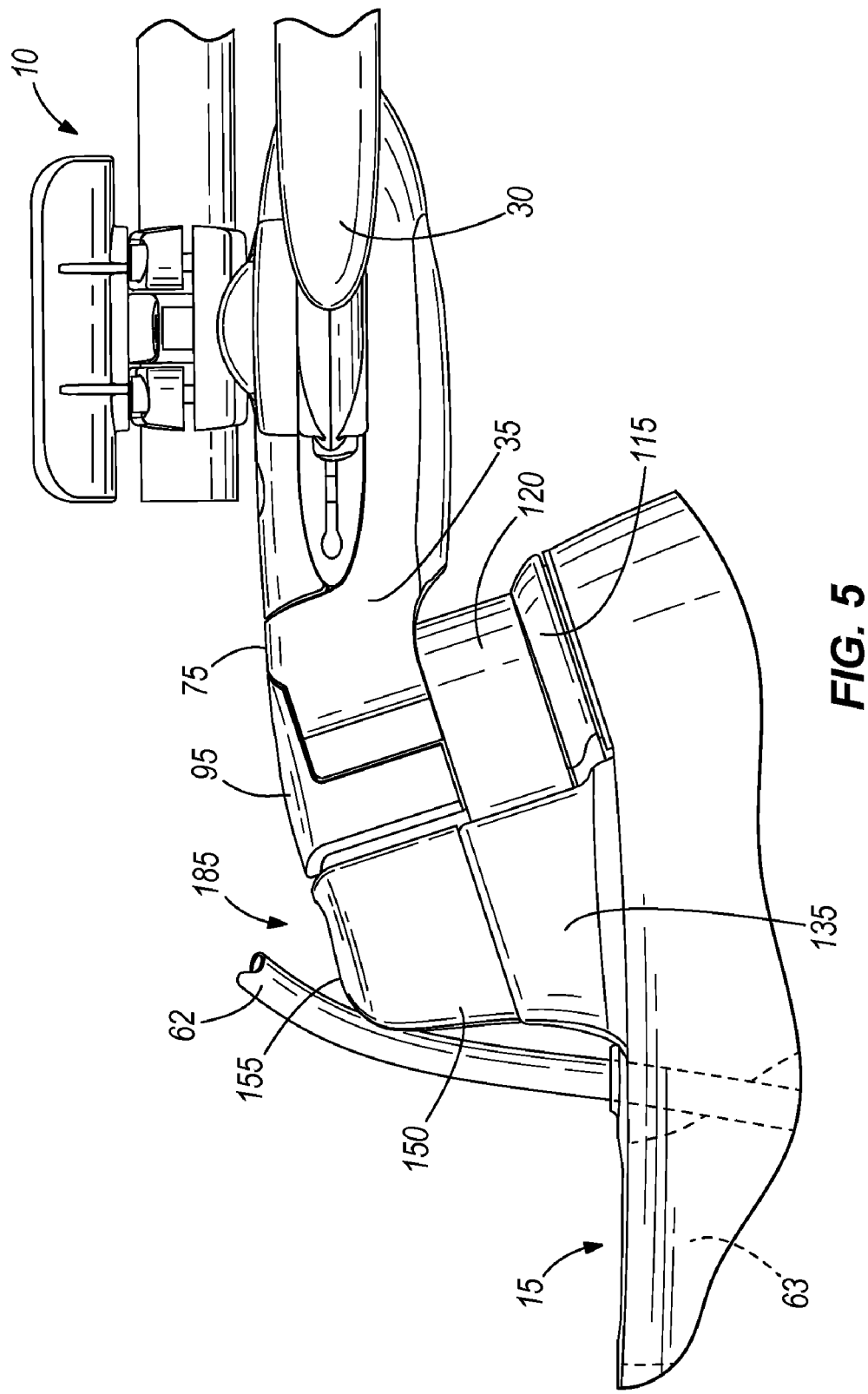
FIG. 5 is an assembled side view of the front portion of the bicycle in FIG. 2, incorporating a second construction of the fairing member.

FIG. 5 illustrates use of the mid second fairing member 185 when the stem 35 is in the mid stem height configuration. In this arrangement, the second stem spacer 125 (FIG. 2) is omitted and the stem 35 mounts on the first stem spacer 120, which mounts on the base 115. Note that the upper surface 155 of the mid second fairing member 185 is substantially flush with the top surface 75 of the stem 35.

Figure 6:
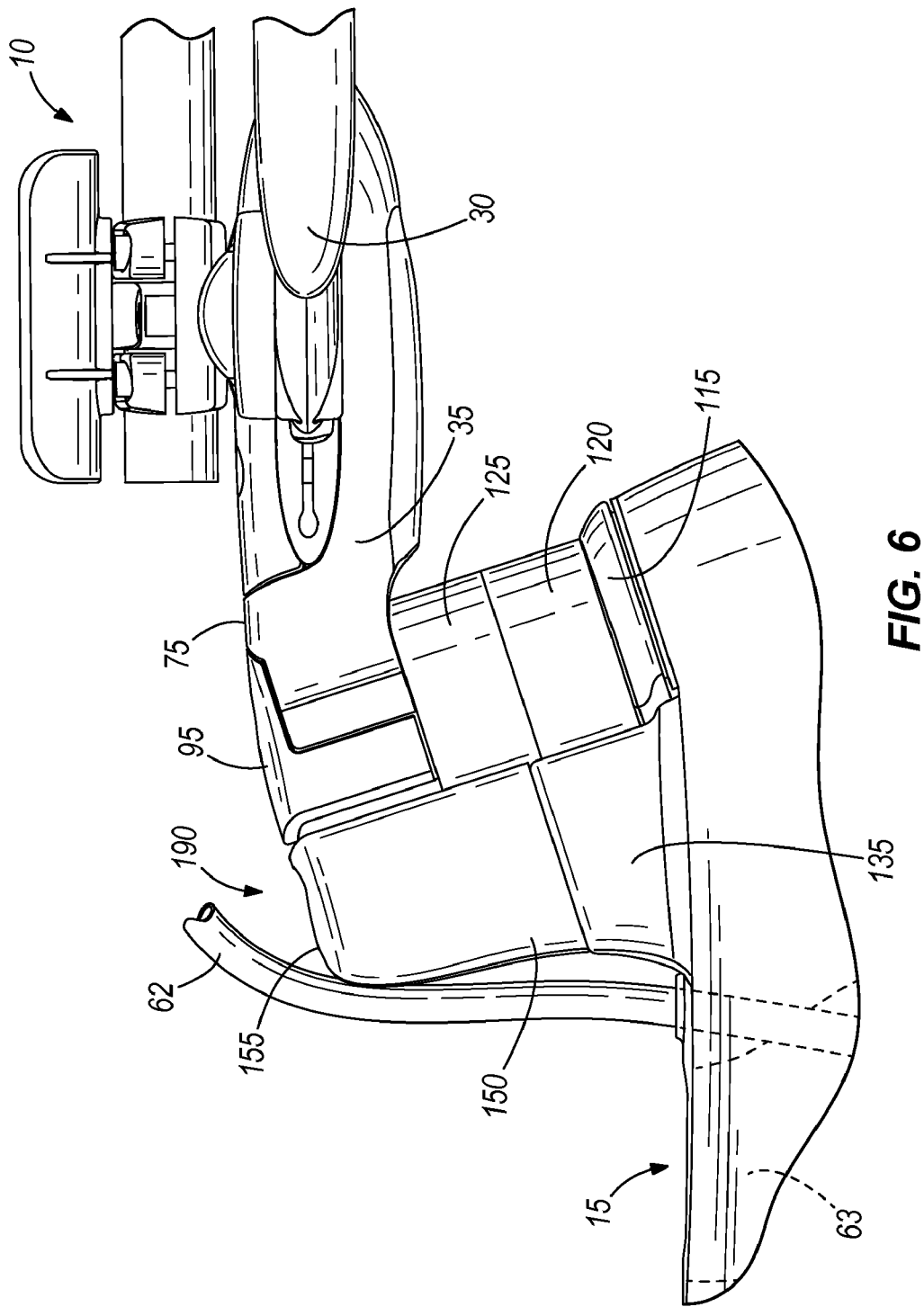
FIG. 6 is an assembled side view of the front portion of the bicycle in FIG. 2, incorporating a third construction of the fairing member.

FIG. 6 illustrates use of the high second fairing member 190 when the stem 35 is in the high stem height configuration. In this arrangement, both of the first and second stem spacers 120, 125 are included and the stem 35 mounts on the second stem spacer 125, which mounts on the first stem spacer 120, which mounts on the base 115. Note that the upper surface 155 of the high second fairing member 190 is substantially flush with the top surface 75 of the stem 35.

In operation, the low, mid, or high second fairing member 180, 185, 190 is selected depending on a user's desired handlebar 30 height. The selected construction of the second fairing member 150 is detachably mounted onto the first outer surface 140 of the first fairing member 130 such that the side surface 135 of the first fairing member is exposed. The corresponding stem spacer 120, 125 arrangement is mounted between the base 115 and the stem 35 such that the upper surface 155 of the second fairing member 150 is substantially flush with the top surface 75 of the stem 35. The invention thus provides an aerodynamic trailing edge for the top and sides of the stem 35, the base 115, and the stem spacers 120, 125, which reduces wind resistance and reduces the effort to propel the bicycle 10 forward.

Various features and advantages of the invention are set forth in the following claims.

The invention claimed is:
1. A bicycle comprising:
a front wheel;
a rear wheel;
a handlebar;
a frame supported on the front and rear wheels, the frame including a frame member;
a front fork supported by the front wheel and rotationally coupled to the frame;
a stem for coupling the handlebar to the front fork, the stem protruding upward above a portion of the frame member;
a first fairing member protruding outward from the frame member and including a side surface defining an aerodynamic trailing edge; and
a second fairing member detachably mounted on the first fairing member such that the side surface is exposed,
wherein the first and second fairing members are positioned immediately behind the stem.

2. A bicycle as claimed in claim 1, wherein the frame member comprises a hollow tube.

3. A bicycle as claimed in claim 1, wherein the frame member comprises a top tube of the frame.

4. A bicycle as claimed in claim 1, wherein the second fairing member includes an upper surface that is substantially flush with a top surface of the stem.

5. A bicycle as claimed in claim 1, wherein the front fork includes a steerer tube, and wherein the second fairing member is positioned entirely rearward of the steerer tube.

6. A bicycle as claimed in claim 1, wherein the first fairing member is formed integrally with the frame member.

7. A bicycle as claimed in claim 1, wherein the first fairing member includes a first outer surface facing away from the frame member, and where the second fairing member is supported on the first outer surface.

8. A bicycle as claimed in claim 1, wherein the second fairing member includes a concave tail edge.

9. A bicycle as claimed in claim 1, wherein the first fairing member has a first front-to-back dimension and the second fairing member has a second front-to-back dimension, and wherein the first front-to-back dimension is greater than the second front-to-back dimension.

10. A bicycle comprising:
a front wheel;
a rear wheel;
a frame supported on the front and rear wheels, the frame including a frame member;
a front fork supported by the front wheel and rotationally coupled to the frame;
a handlebar;
a stem for coupling the handlebar to the front fork, the stem protruding upward above a portion of the frame member; and
a fairing member detachably coupled to the frame member and positioned immediately behind the stem, the fairing member including an upper surface that is substantially flush with a top surface of the stem.

11. A bicycle as claimed in claim 10, wherein the frame member comprises a top tube of the frame.

12. A bicycle as claimed in claim 10, wherein the front fork includes a steerer tube, and wherein the fairing member is positioned entirely rearward of the steerer tube.

13. A bicycle as claimed in claim 10, wherein the fairing member includes a concave tail edge.

14. A bicycle frame comprising:
a frame member comprising a top tube of the frame;
a front fork rotationally coupled to the frame;
a stem for coupling a handlebar to the front fork, the stem protruding upward above a portion of the top tube;
a first fairing member protruding outward from the frame member and including a side surface defining an aerodynamic trailing edge; and
a second fairing member detachably mounted on the first fairing member such that the side surface is exposed, wherein the first and second fairing members are positioned immediately behind the stem.

15. A bicycle frame as claimed in claim 14, wherein the second fairing member includes an upper surface that is substantially flush with a top surface of the stem.

16. A bicycle frame as claimed in claim 15, wherein the second fairing member includes a side surface that is substantially flush with a side surface of the stem.

* * * * *